Sept. 9, 1941.                C. T. WALTER                    2,255,635
                    INVERTER AND TRANSFER MECHANISM
                          Filed Aug. 29, 1938
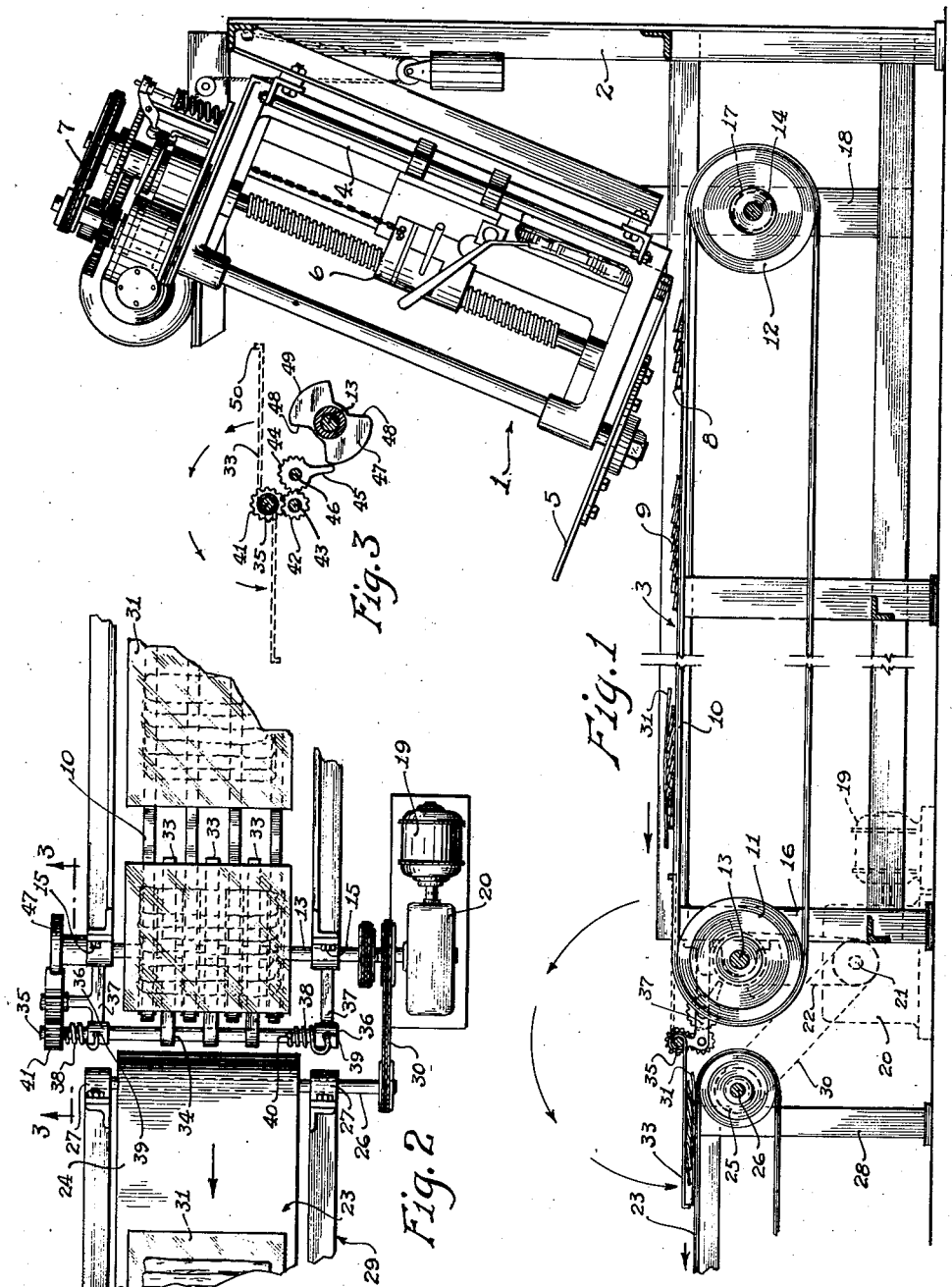
Charles T. Walter
INVENTOR
ATTEST –
BY
ATTORNEY

Patented Sept. 9, 1941

2,255,635

UNITED STATES PATENT OFFICE

2,255,635

INVERTER AND TRANSFER MECHANISM

Charles T. Walter, Chicago, Ill., assignor to Industrial Patents Corporation, Chicago, Ill., a corporation of Delaware Application August 29, 1938, Serial No. 227,427

6 Claims. (Cl. 198—33)

This invention relates to an improved inverter and transfer mechanism.

One of the objects of the invention is to provide an improved inverter and transfer mechanism.

Another object of the invention is to provide an improved means for inverting articles during transfer of the articles from one conveyor system to another conveyor system.

Another object of the invention is to provide means for inverting groups of meat slices during transfer of the groups of meat slices from a slice receiver conveyor to a slice delivery conveyor.

Other objects of the invention will be apparent from the description and claims which follow.

Reference is had to the drawing in which like reference characters are used to designate similar elements.

Figure 1 is a side view, partly in section, showing a meat slicing and conveying system in which the inverter and transfer mechanism of the present invention is employed. In this figure, the mechanism is shown in dotted lines in slice receiver position and in full lines in slice delivery position.

Figure 2 is a plan view of the conveying system and the slice inverter and transfer mechanism shown in Figure 1.

Figure 3 is a side view showing in detail the drive means operating the inverter and transfer mechanism. This figure may be considered as taken on the line 3—3 of Figure 2.

In the drawing, slicing machine 1 is shown mounted upon suitable framework 2 relative to slice receiver conveyor 3 and adapted to deposit meat slices, for example, bacon slices, thereon.

Slicing machine 1 may be of the type described and claimed in my prior patent, No. 2,047,399, issued July 14, 1936, entitled Slicing machine. The slicing machine shown in my prior patent comprises, broadly, base 4, cutter 5, means 6 for feeding material to cutter 5 and means 7 operable intermittently to move feeding means 6 from and toward cutter 5 to periodically interrupt the cutting operation of cutter 5.

Conveyor 3 is operable in synchronism with cutter 5. In operation cut slices 8 are deposited onto conveyor 3 in groups 9 of slices of a predetermined number, the slices of each group being deposited onto the conveyor in overlapping relationship. The arrangement of the slices in overlapping relationship and in groups of a predetermined number is due, of course, to the movement of conveyor 3 relative to cutter 5 and the periodic interruption of the feeding movement of feeding means 6.

Conveyor 3 is of the endless spaced strand type comprising strands 10 mounted upon pulleys 11 and 12, respectively pinned to shafts 13 and 14. Shaft 13 is journaled in suitable bearings 15, bolted or otherwise rigidly secured to uprights 16 of framework 2. Shaft 14 is journaled in suitable bearings 17, rigidly secured to uprights 18 of framework 2. Conveyor 3 is driven by power transmitted from motor 19 through the medium of gear box 20, shaft 21 and gearing 22 connecting shaft 21 with shaft 13.

Slice delivery conveyor 23 is mounted in spaced end to end relationship and in substantially longitudinal alignment with slice receiver conveyor 3. Conveyor 23 may be of the endless belt type, the belt 24 being mounted upon suitable rollers such as, for example, roller 25. Roller 25 is pinned to shaft 26, journaled in suitable bearings 27, rigidly secured to uprights 28 of framework 29. Shaft 26 is driven from shaft 21 through the medium of gearing 30. The speed of conveyor 23 may be the same as, or if desired, may be increased relative to the speed of conveyor 3.

During travel of the groups of bacon slices on conveyor 3, a sheet of wrapper paper 31 is placed upon the top surface of each group. Each group of slices, together with its wrapper sheet 31, at the end of its travel on conveyor 3, is transferred to conveyor 23 and simultaneously is inverted so that wrapper sheet 31 is laid adjacent the conveyor surface of conveyor 23. Obviously, the placement of wrapper sheets 31 upon the groups of slices may be mechanically accomplished by a suitable device mounted relative to conveyor 3 and operable in synchronism therewith.

The inverted groups of slices 9 together with the wrapper sheets 31 may be carried on conveyor 23 to a wrapping station for wrapping according to conventional practice in which each group of slices 9 is folded as a unit with the wrapper sheet 31 to form a package. It will be seen that final wrapping of the groups of slices 9 is greatly facilitated by inverting the groups of slices 9 and the wrapper sheets 31 prior to delivery to the wrapping station.

The inverter and transfer mechanism comprises a plurality of stripper fingers 33 rigidly secured as at 34 to shaft 35. Shaft 35 is mounted intermediate the ends of conveyors 3 and 23 in suitable bearings 36, rigidly secured as by arms 37 to uprights 16 of framework 2.

Shaft 35 and thus fingers 33 are normally urged in slice delivery position, that is, in the position in which the slices are deposited onto conveyor 23 as shown in full lines in Figure 1. However, shaft 35 and thus fingers 33 are normally maintained in slice receiver position, that is, in a position to receive the slices at the end of their travel on conveyor 3 as shown in Figure 2. Fingers 33 when in slice receiver position are maintained between and below the conveying surfaces of spaced strands 10.

The mechanism for operating shaft 35 and fingers 33 comprises coil springs 38 for normally urging the shaft and fingers to slice delivery position and the cam and gear mechanism shown in Figure 3 for normally maintaining the shaft and fingers in slice receiver position.

Coil springs 38 are mounted on shaft 35 and at one of their ends are rigidly secured as by openings 39 in bearings 36 and at their opposite ends are rigidly secured as by openings 40 in shaft 35.

As shown in Figures 2 and 3, gear wheel 41 is rigidly secured to shaft 35. Gear wheel 42 is rotatably mounted on trunnion 43 for mesh with gear wheel 41. Trunnion 43 is rigidly secured to arm 37. Mutilated gear 44 provided with radial lug 45 is rotatably mounted on trunnion 46 for mesh with gear wheel 42. Cam 47 is rigidly secured to driven shaft 13 and is provided with alternate dwells 48 and high points 49. High points 49 are adapted for engagement with lug 45.

Cam 47, since it is secured to driven shaft 13, serves to operate shaft 35 and thus fingers 33 in synchronism with the movement of conveyor 3. High points 49 engage lug 45 and thus through the medium of gears 42 and 44 serve to normally maintain fingers 33 in slice receiver position.

However, during movement of dwells 48 adjacent lug 45, cam 47 is moved completely out of engagement with lug 45 whence shaft 35 and fingers 33 are free to rotate according to the action of springs 38. It is during this period that fingers 33 are swiftly moved into slice delivery position.

The movement of fingers 33 from slice receiver to slice delivery position is very rapid. Consequently, fingers 33 are made to follow through without chance of dropping the slices being transferred between the ends of the conveyors. On the other hand, fingers 33 are bent at their free ends to provide grab prongs 50 to prevent throwing of the slices being transferred by reason of the force of movement of fingers 33.

I claim:

1. In combination with a receiver conveyor and a delivery conveyor mounted in spaced end to end relationship and in substantially longitudinal alignment with the receiver conveyor, inverter and transfer means mounted intermediate the conveyors comprising a shaft rotatably mounted between the ends of the conveyors, a plurality of fingers rigidly secured to the shaft, means normally urging the fingers into delivery position relative to the delivery conveyor and means for periodically returning the fingers to receiving position relative to the receiver conveyor, the last-mentioned means comprising a gear wheel rigidly secured to the shaft, a mutilated gear provided with a radial lug operatively engageable with the gear wheel and a cam having surfaces alternately engageable and disengageable with the lug.

2. In combination with a receiver conveyor and a delivery conveyor mounted in spaced end to end relationship and in substantially longitudinal alignment with the receiver conveyor, inverter and transfer means mounted intermediate the conveyors comprising a shaft rotatably mounted between the ends of the conveyors, a plurality of fingers rigidly secured to the shaft, means normally urging the fingers into delivery position relative to the delivery conveyor and means for periodically returning the fingers to receiving position relative to the receiver conveyor, the last-mentioned means comprising a gear wheel rigidly secured to the shaft, a mutilated gear provided with a radial lug operatively engageable with the gear wheel and a cam having surfaces alternately engageable and disengageable with the lug, the cam being operable in synchronism with means for feeding material to the receiver conveyor and the movement of the receiver conveyor.

3. In combination with a spaced strand receiver conveyor and a delivery conveyor mounted in spaced end to end relationship and in substantially longitudinal alignment with the receiver conveyor, inverter and transfer means mounted intermediate the ends of the conveyors comprising a shaft rotatably mounted between the ends of the conveyors, a plurality of fingers rigidly secured to the shaft, means normally urging the fingers into delivery position relative to the delivery conveyor and means for periodically returning the fingers to receiver position relative to the receiver conveyor, the last-mentioned means comprising a gear wheel rigidly secured to the shaft, a mutilated gear provided with a radial lug operatively engageable with the gear wheel and a cam having surfaces alternately engageable and disengageable with the lug, the cam being operable in synchronism with means for feeding material to the receiver conveyor and the movement of the receiver conveyor, the fingers when in receiver position relative to the receiver conveyor being adapted to interfit between and below the conveying surfaces of the spaced strands of the receiver conveyor.

4. In combination with a spaced strand receiver conveyor and a delivery conveyor mounted in spaced end to end relationship and in substantially longitudinal alignment with the receiver conveyor, inverter and transfer means mounted intermediate the ends of the conveyors comprising a shaft rotatably mounted between the ends of the conveyors, a plurality of fingers rigidly secured to the shaft, means normally urging the fingers into delivery position relative to the delivery conveyor and means for periodically returning the fingers to receiver position relative to the receiver conveyor, the last-mentioned means comprising a gear wheel rigidly secured to the shaft, a mutilated gear provided with a radial lug operatively engageable with the gear wheel and a cam having surfaces alternately engageable and disengageable with the lug, the cam being operable in synchronism with means for feeding material to the receiver conveyor and the movement of the receiver conveyor, the fingers when in receiver position relative to the receiver conveyor being adapted to interfit between and below the conveying surfaces of the spaced strands of the receiver conveyor, each of the fingers being bent substantially at a right angle at its free end to provide a grab prong to prevent throwing of material therefrom during transfer of the material from the receiver conveyor to the delivery conveyor.

5. In combination with a receiver conveyor and a delivery conveyor mounted in spaced end to end relationship and in substantially longitudinal alignment with the receiver conveyor, inverter and transfer means mounted intermediate the ends of the conveyors comprising a rotatable shaft provided with a plurality of radially extended receiver fingers, tensionable means operatively connected with the shaft and adapted normally to urge the fingers into delivery position relative to the delivery conveyor, means operatively associated with the shaft and adapted to rotate the shaft against the action of the tensionable means, and cam means alternately engageably and disengageably associated with the last mentioned means operatively associated with the shaft, and during engagement, being operable to return the fingers periodically from delivery position relative to the delivery conveyor to receiver position relative to the receiver conveyor, the shaft and fingers being rapidly rotated from receiver position relative to the receiver conveyor to delivery position relative to the delivery conveyor by action of the tensionable means during disengagement of the cam means with the means associated with the shaft.

6. In combination with a delivery means and a receiver means, an inverter and transfer means mounted intermediate said delivery and receiver means comprising a rotatable fly means, yielding means continually urging said fly means into an inverted delivery position, means operatively associated with the fly means adapted to positively rotate said fly means from its inverted position against the action of said urging means, rotating means alternately engageable and disengageable with the means adapted to rotate the fly means which rotating means during engagement operates to positively rotate the fly means from its normally inverted delivery position to it receiving position, and which rotating means during disengagement releases the fly means to the sole action of the urging means which rapidly returns the fly means to the inverted discharge position.

CHARLES T. WALTER.